United States Patent [19]
Raque

[11] 3,938,647
[45] Feb. 17, 1976

[54] ARTICLE FEEDING SYSTEM
[75] Inventor: Glen F. Raque, Louisville, Ky.
[73] Assignee: FMC Corporation, San Jose, Calif.
[22] Filed: July 16, 1973
[21] Appl. No.: 379,668

[52] U.S. Cl. .......................... 198/31 AA; 198/31 AC
[51] Int. Cl.² .......................................... B65G 47/26
[58] Field of Search ......... 198/31 R, 31 AA, 31 AB, 198/31 AC, 21; 214/11 R

[56] References Cited
UNITED STATES PATENTS

| | | | |
|---|---|---|---|
| 3,277,995 | 10/1966 | Seed | 198/31 R |
| 3,500,983 | 3/1970 | Watkins | 198/31 AB |
| 3,580,379 | 5/1971 | Shuster | 198/31 AB |
| 3,731,782 | 5/1973 | Rosso | 198/31 R |

*Primary Examiner*—Evon C. Blunk
*Assistant Examiner*—Joseph E. Valenza
*Attorney, Agent, or Firm*—C. E. Tripp

[57] ABSTRACT

A high speed article feeding system for forming a single lane input of articles into a multiple lane output delivered in a controlled sequence regardless of occasional missisng articles in the input lane. The apparatus includes an endless conveyor with a continuous series of laterally movable article support plates or bars, a plurality of which form one group supporting a single article. Alternate groups of support plates are mechanically separated to follow to the left and right sides of the longitudinal centerline of the conveyor. Then, the separated left and right side groups are each diverted to one or the other of two output lanes by electro-mechanical means including two switching gates. By mechanically separating the input of articles into two groups, followed by an electro-mechanical diversion to further separate each of the two groups into one or the other of two output lanes, high speed, four lane discharge is achieved without the usual response-time limitations of the conventional single-gate type of diverter.

2 Claims, 16 Drawing Figures

FIG_6

FIG_7

FIG_8

FIG_9
FIG_10

FIG_11

FIG_12

FIG_13
FIG_14

ARTICLE FEEDING SYSTEM

BACKGROUND OF THE INVENTION

The field of the present invention concerns article diverters wherein a single lane input of articles is arranged into a multiple lane output. One such diverter is disclosed in the United States reissue patent to Seaborn 25,732, issued Feb. 23, 1965. There are other commercially available article diverters, but apparently the operating principles of all such diverters are that the diverting means requires very rapid operation and precise control to achieve a high output. Thus, in a conventional diverting mechanism having four output lanes, the diverting gate is mechanically limited in its response time if the output is at the rates herein contemplated, in the order of 180 articles per minute.

SUMMARY OF THE INVENTION

By providing an initial mechanical separation of a single input lane of articles to alternately follow one of two diverting paths, and by then further separating the articles in each path by a selectively operable switching mechanism wherein the two switching mechanisms alternately operate, each switching mechanism can operate at relatively low speed, but the overall production is at a high cumulative discharge rate.

BRIEF DESCRIPTION OF THE DRAWINGS

FIG. 3 is an enlarged plan, partly broken away, of the article feeding mechanism in association with a single lane feed conveyor, and a four lane receiving conveyor.

FIGS. 10–14 are diagrams similar to FIG. 9 but illustrating different operational conditions.

DESCRIPTION OF THE PREFERRED EMBODIMENT

Figure 1:
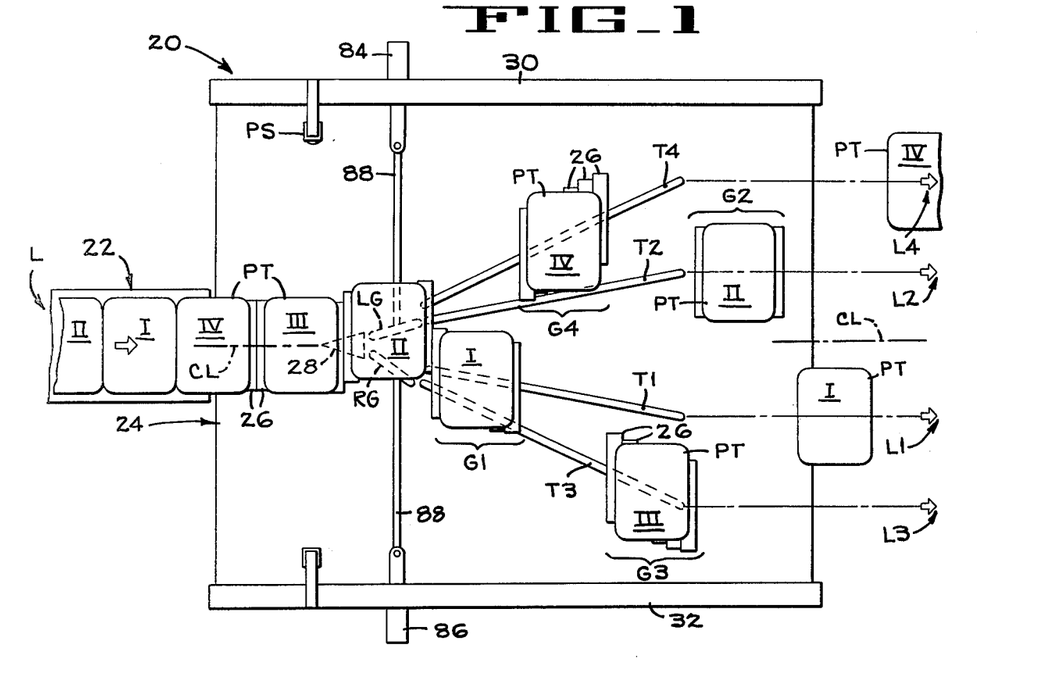
FIGS. 1 and 2 are diagrammatic plans of the article feeding mechanism of the present invention illustrating two successive stages of one operating mode.
Figure 2:
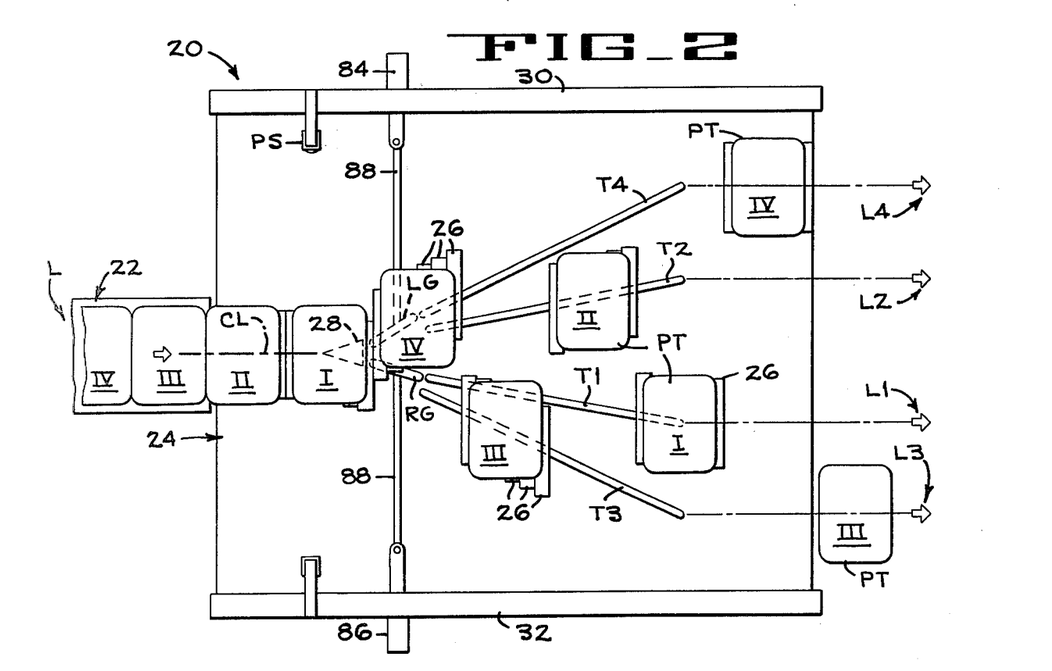

With reference to FIGS. 1 and 2, the organization and general operating mode of the article feeding mechanism 20 is briefly outlined. In one specific application of the feeding mechanism 20, plastic food trays PT are delivered in a single file lane L by a conveyor 22, the details of which are not important to the present invention, onto the input end 24 along the longitudinal centerline CL of the feeding mechanism. Each tray PT is supported by a group of support bars or article carriers 26 which are laterally movable relative to the centerline CL.

In traversing the upper conveying surface of the feeding mechanism 20 to discharge lanes L1, L2, L3 and L4, the trays PT are first sensed by a photoelectric scanner PS, and then the support bars 26 encounter a wedge-shaped diverting cam 28, a power operated left gate LG or a similarly operated right gate RG, and depending upon the positions of the gates, one of four guide tracks T1, T2, T3, or T4, that respectively channel the trays PT to the discharge lanes L1, L2, L3 and L4. In the particular delivery order disclosed herein by way of example, the trays PT are identified as to their order of passage to the discharge lanes by the Roman numerals I, II, III or IV on each tray. Similarly, the lane designations L1, L2, L3 or L4 indicate the order in which the lanes receive the trays, and the guide tracks T1, T2, T3 or T4 indicate the order in which they divert the trays to the discharge lanes.

It is assumed that the trays PT are in successive incoming groups numbered I to IV. As trays I and II are carried past the cam 28, the support bars 26 carrying tray number I are diverted toward the right gate RG, and the support bars carrying tray number II are diverted toward the left gate LG. A control circuit, which received a control pulse when the trays I and II passed the photoelectric scanner PS, causes both gates LG and RG to assume the positions shown in FIG. I for the gate LG, before the trays I and II arrive at the gates, and only for enough time for the trays to pass their respective gates. Thus, tray I is directed by the gate RG to follow the guide track T1 and be discharged in lane L1. Tray II is directed by the gate LG to follow the guide track T2 and be discharged in lane L2.

The next two trays, numbers III and IV, will be laterally separated by the wedge cam 28 acting on the support bars 26, as mentioned in connection with the first two trays. As tray number III (FIG. 1) passes the photoelectric scanner PS, the control circuit is actuated to move the gate RG to the position shown, whereby the support bars 26 carrying that tray will be directed to the guide track T3 and the tray will be discharged in lane 3. As shown in FIG. 2, the gate LG is similarly operated to direct tray number IV to the guide track T4 and out the lane L4. The inlet end of a receiving conveyor RC is shown in FIG. 1 for delivering the trays to further downstream processing stations. The details of this conveyor are not critical to the present invention, and it is not further referred to.

Some important points should be noted prior to a detailed description of the structural components of the present invention.

1. Certain groups of support bars (and the articles thereon) always have a predetermined destination to the left or right of the centerline CL. Thus, articles I and III are destined for the right, and articles II and IV are destined for the left.

2. The gates LG and RG are always switched when they are free of any engagement with the support bars 26.

3. If an incoming tray PT is missing from the input lane L, the delivery order to the discharge lanes L1-L4 is not altered.

With reference now to FIG. 3 and a more specific disclosure of the structure and function of the article feeding mechanism 20, laterally spaced upright frames 30 and 32 carry longitudinally spaced transverse idler and drive shafts 34 and 36. A convenient application of power is by means of a chain and sprocket drive unit 38 on the shaft 36, and preferably coupled to the feed conveyor 22 (by means not shown) to maintain a timed relation between the article feeding mechanism 20 and the trays delivered by the conveyor 22. Thus, the latter conveyor may include, for example, upstanding pushers 40 which deliver the trays over a deadplate 42, and a drive connection to the drive unit 38 for moving the article support bars 26 in timed relation to the incoming trays.

Aligned pairs of sprockets 44 and 46 on the shafts 34 and 36 carry laterally spaced endless chains 48 and 50. Fixed to the chains is an endless series of equally interspaced transverse rods 52 for slidably mounting the article support bars 26. As clearly shown in FIGS. 3 and 4, six support bars form the support surface for one tray, and each bar 26 has grooved edges engaging two adjacent rods 52. The bars 26 are preferably formed of plastic having a low coefficient of friction so that they are freely movable endwise. A stop 54 on the leading and trailing support bars 26, plus clips 56 on one of the intermediate support bars, retain the tray.

Figures 4, 4A, 4B, 5:
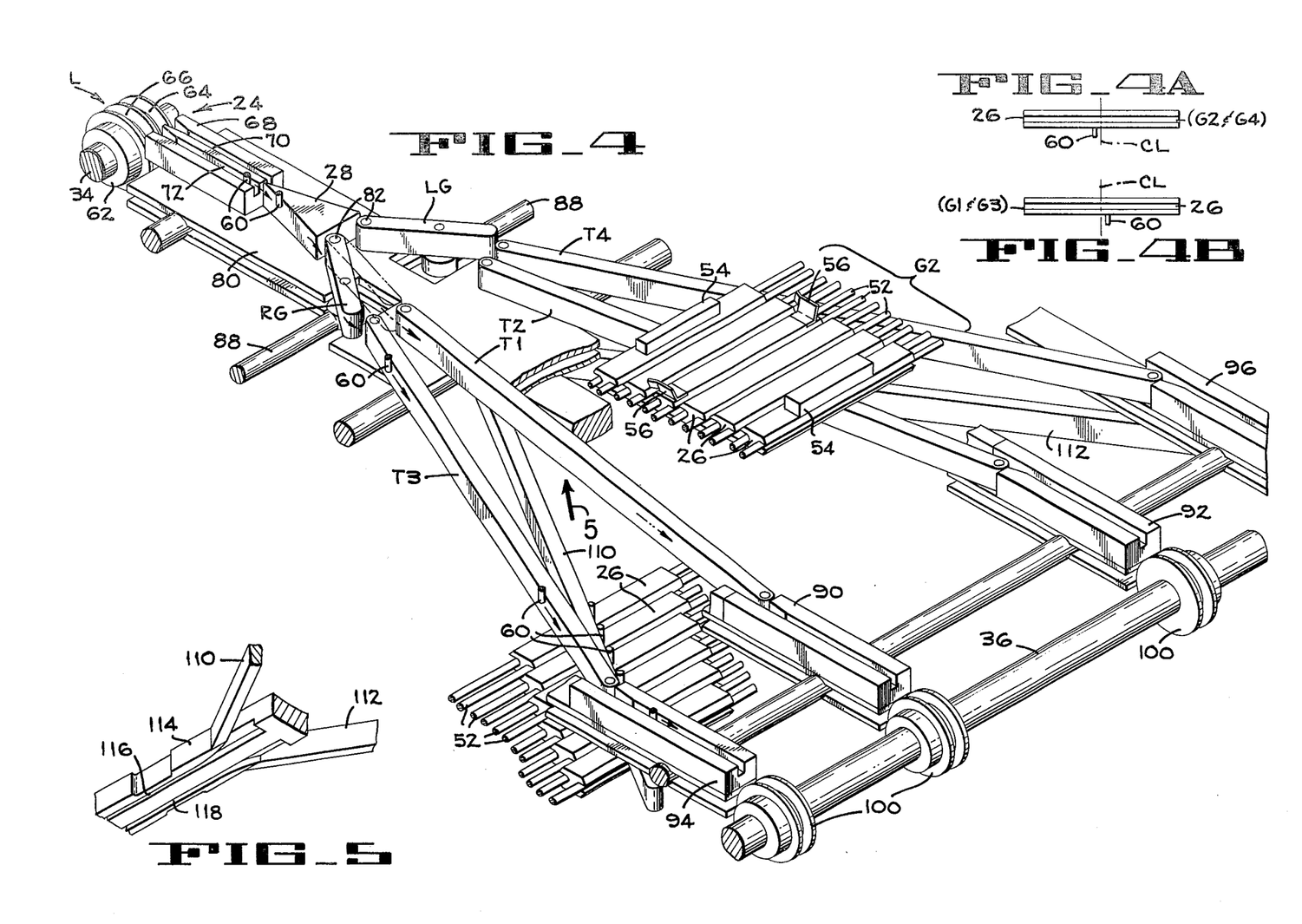
FIG. 4 is an isometric view of the major operating components of the article feeding mechanism shown in FIG. 3.
FIGS. 4A and 4B are elevations of the two different forms of article carrier bars used in the article feeding mechanism.
FIG. 5 is a fragmentary underside isometric of the area indicated by the arrow 5 on FIG. 4.

Each support bar 26 is provided with a projecting switch pin 60 (FIG. 3) which, when the support bars 26 traverse the upper, conveying reach of the article feeding mechanism 20 depend for engaging the gates LG and RG, the guide tracks T1, T2, T3 and T4, and other guide means which are presently described. Referring to FIGS. 4A and 4B, the switch pins 60 on one group of support bars is offset from the center of the bar to the left, looking in a downstream direction, and the pins on another group of support bars have their pins offset to the right. In the first instance, these support bars are those which are diverted by the cam 28 to travel down the left side of the centerline CL, and the other bars travel down the opposite side. As installed on the rods 52, one group of six support bars 26 with the switch pins 60 offset in one direction is preceded and followed by groups of six bars having their switch pins offset in the other direction. It is evident, therefore, that the groups of support bars have switch pins oriented to cause the groups to alternately follow different paths.

Considering only the upper conveying reach of the article feeding mechanism 20, one group of support bars 26 approaching the reach have their switch pins 60 disposed to follow the left track 64 of a double-grooved guide spool 62, and the following group have their pins disposed to follow the right track 66 of the guide spool. The guide spool rotates and is fixed to the idler shaft 34. Immediately downstream of the guide spool 62 is a guide block 68 having linear tracks 70 and 72 for assuming guidance of the left-oriented and right-oriented switch pins 60.

Figure 6:
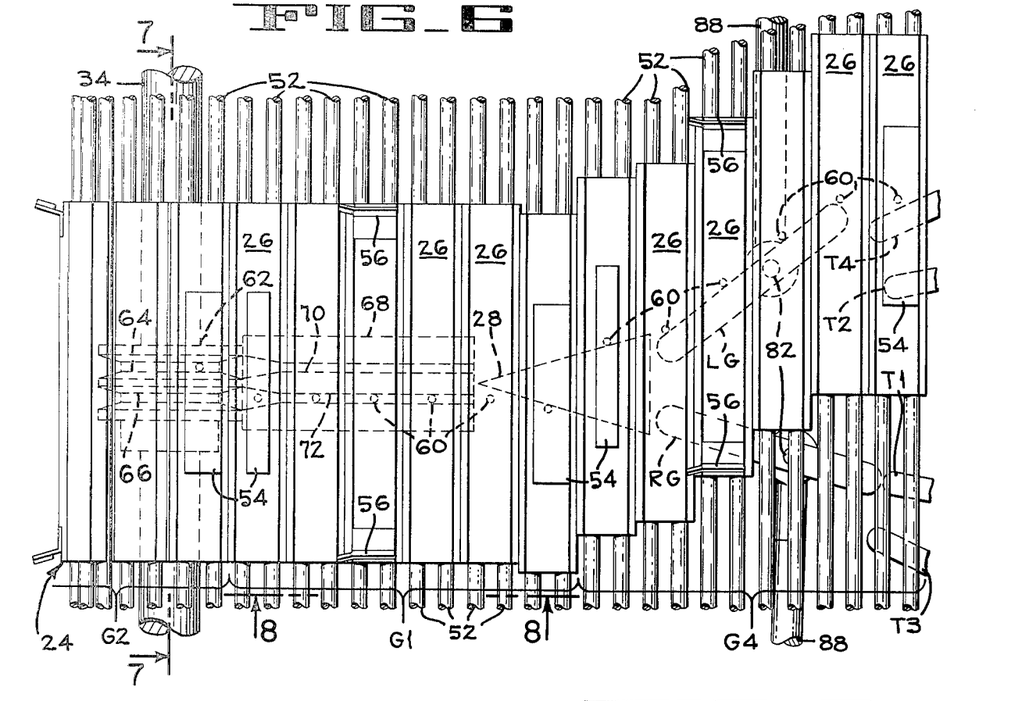
FIG. 6 is an enlarged plan of the inlet end of the article feeding mechanism shown in FIG. 3.
Figure 7:
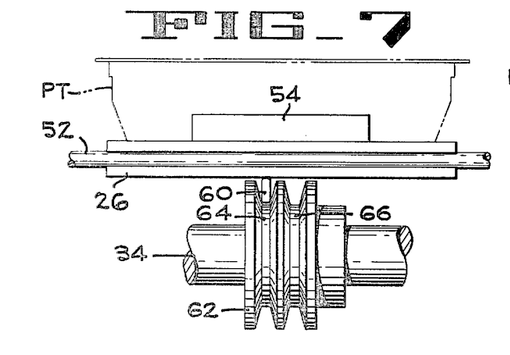
FIG. 7 is a vertical section taken along lines 7—7 on FIG. 6.
Figure 8:
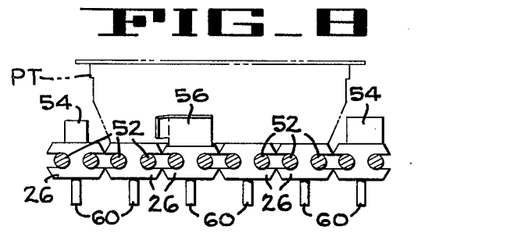
FIG. 8 is a vertical section taken along lines 8—8 on FIG. 6, with a phantom-outline article being conveyed.
Figure 9:
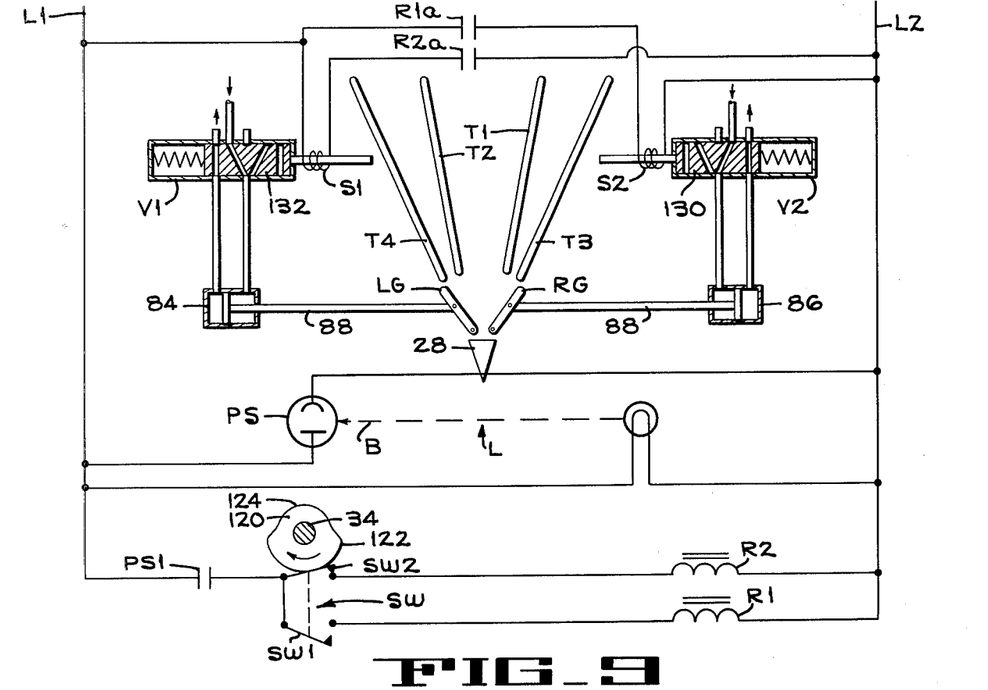
FIG. 9 is a simplified electric and pneumatic control diagram in association with certain mechanisms controlled thereby.

In FIG. 3 the groups of support bars 26 are each collectively identified as G1, G2, G3 and G4, according to their discharge lane destination L1, L2, L3 or L4, but not necessarily according to articles I, II, III or IV. Thus, groups G1 and G3 have their switch pins 60 offset to the right, as shown in FIG. 4B, and are destined for the right hand side of the feeding mechanism, while the groups G2 and G4 have their switch pins offset to the left as shown in FIG. 4A and are destined for the left side of the feeding mechanism. As seen in FIGS. 3 and 6, the apex of the fixed wedge cam 28 is straddled by the switch pins 60 on alternate groups, and hence even though the cam 28 is a fixed cam, it shifts the carriers of one group into one intermediate lane and the carriers of the following group into a second intermediate lane. With continued reference to FIG. 3, it will be seen that the group G1 track pins are engaged with the track 72 of the guide block 68 and that the two leading pins are engaged with the adjacent side of the wedge cam 28 for movement toward the right gate RG. The succeeding group G2 pins, shown engaged with the left track 64 of the guide spool 62, will follow the guide track 70 of the guide block 68 for subsequent diverting movement by the wedge cam 28 to the left side of the machine. As thus far described, it is evident that successive groups G1, G2, G3, G4 are alternately and automatically diverted to the right and to the left of the centerline CL.

The switching gates LG and RG (FIG. 4) are each mounted on a base plate 80 for swinging movement about a pivot stud 82, and are respectively connected to double-acting air cylinders 84 and 86 (FIG. 3) by lengthwise adjustable links 88. The gate LG is illustrated at its outer limit of movement for directing the group G4 switch pins 60 to engage the outer side of the guide track T4. The gate RG is shown at its inner limit of movement as it is positioned for directing the group G1 switch pins 60 to engage the outer side of the guide track T1. When the gate positions are reversed, the group G2 pins 60 will be directed against the outer side of the guide track T2, and the group G3 pins will be directed against the outer side of the guide track T3.

As shown in FIG. 4, the guide tracks T1, T2, T3 and T4 direct the switch pins 60 into grooved guide blocks 90, 92, 94 and 96, from which the switch pins enter circumferentially grooved guide spools 100 on the drive shaft 36 for guidance to the lower reach of the conveying surface. In traversing the lower reach toward the inlet end of the machine, the pins 60 on the group G1 and G3 support bars 26 engage a return guide track 110 to slide the bars toward the centerline of the feeding mechanism. A similar return guide track 112 cams the group G2 and G4 support bars toward the centerline. FIG. 5 shows the underside of a central guide block 114 which has a guide groove 116 merging with the return guide track 110, and a similar groove 118 merging with the guide track 112. The grooves 116 and 118 are respectively aligned with the track grooves 66 and 64 (FIG. 4) of the guide spool 62. Accordingly, all groups of support plates are returned to a single lane at the inlet end of the feeding mechanism, adjacent the delivery conveyor 22 at the completion of each orbit about the shafts 32 and 34.

FIGS. 9-14 show the control system of the article feeding mechanism 20 under various operating conditions, and have been reduced to the most simplified form which will disclose the inventive principles. The exact operating sequence to be disclosed is not critical to the invention, and is merely given as one working example.

The control system is governed by a timing cam 120 (FIG. 3) that may be rotated by the idler shaft 34 to send appropriate control signals in timed relation with the passage of the trays PT. While there are many ways to achieve this end result, for the present example it is assumed that in the time necessary for one revolution of the shaft 34, two trays PT will pass a given point on the upper conveying reach. Thus, the cam 120 (FIG. 10) is provided with a single lobe 122 of about 180° angular extent that corresponds, as will later become clear, to the support plate groups G2 and G4 that travel down the left side of the centerline CL. The remaining dwell portion 124 of the cam 120 corresponds to the support plate groups G1 and G3 that travel down the right side of the centerline.

An electrical switch SW is operated by the cam 120 and is provided with ganged normally closed contacts SW1 and normally opened contacts SW2 that respectively control the latching relays R1 and R2 in conjunction with a set of contacts PS1 that are operated by the photoelectric scanner PS when a tray is sensed in the light beam B. The air cylinders 84 and 86 which operate the gates LG and RG are directly controlled by air valves V1 and V2. The air valves V1 and V2 are solenoid-operated, with a spring return, by solenoids S1 and S2. The contacts R1a of relay R1 will, when closed, connect the solenoid S2 between the electrical input lines L1 and L2 to shift the core 130 of the valve V2 to the right. The valve V1 is similarly operated, by the relay contacts R2a, to shift its valve core 132 in the opposite direction.

The latching relays R1 and R2 are provided with preconditioning switches, not shown, which are momentarily closed by the operator to open the contacts R1a and R2a before an operating cycle begins. Each latching relay is of the type where a momentary energization of the relay will cause its contact to assume a condition opposite to its former condition, and the contact remains in that position until the next energization of the relay. The open condition of the relay contacts R1a and R2a can be remotely indicated by using latching relays with auxiliary contacts that close to energize lights when the contacts R1a and R2a are open, or the gates LG and RG can be visually observed. If the gates are respectively aligned with the guide tracks T4 and T3, the contacts R1a and R2a are open.

Figure 10:
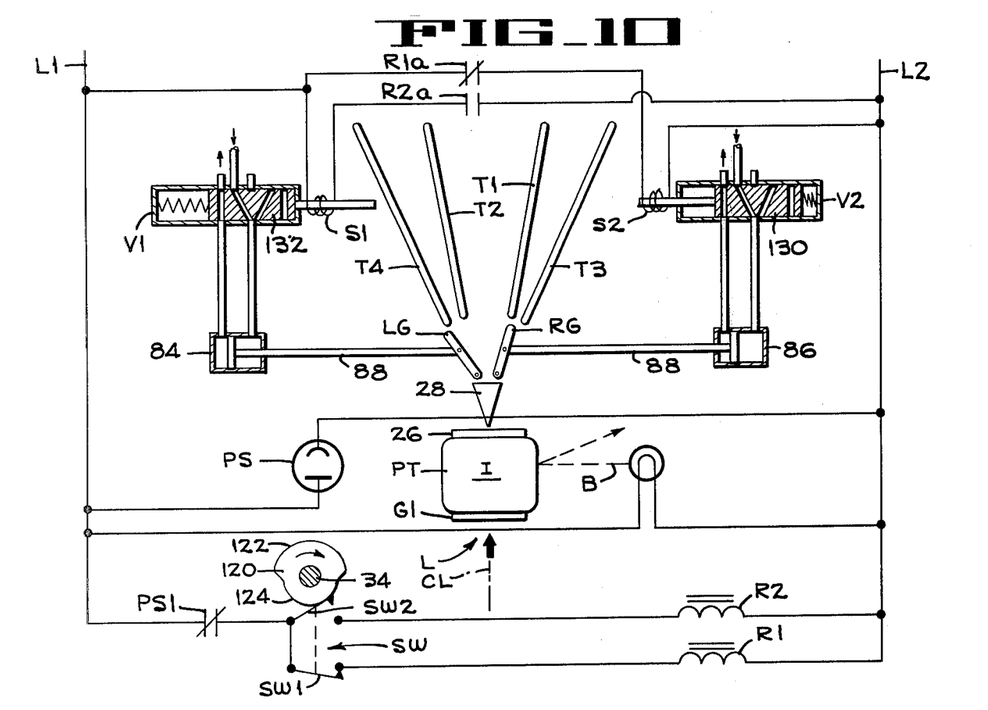

In FIG. 10, the first incoming tray PT (number I) supported by group G1 support bars is being conveyed past the photoelectric scanner PS to interrupt the beam B and momentarily close the scanner contacts PS1. Meanwhile, the cam 120 has rotated to a position releasing the switch contacts SW2 to open position, and closing the switch contacts SW1. This closes the energization circuit for latching relay R1, whereby the now closed relay contacts R1a energize the solenoid S2 to shift the valve core 130 of air valve V2 and pressurize the blind end of the air cylinder 86. Thus, the gate RG is swung inward to a position aligned with the guide track T1. Since the relay contacts R1a remain in a closed position even after the tray PT is past the light beam B, the group G1 support bars are directed by the cam 28 to the gate RG at the right of the centerline CL, and are directed by the gate along the track T1 to later discharge the tray in lane L1 (FIG. 1).

Figure 11:
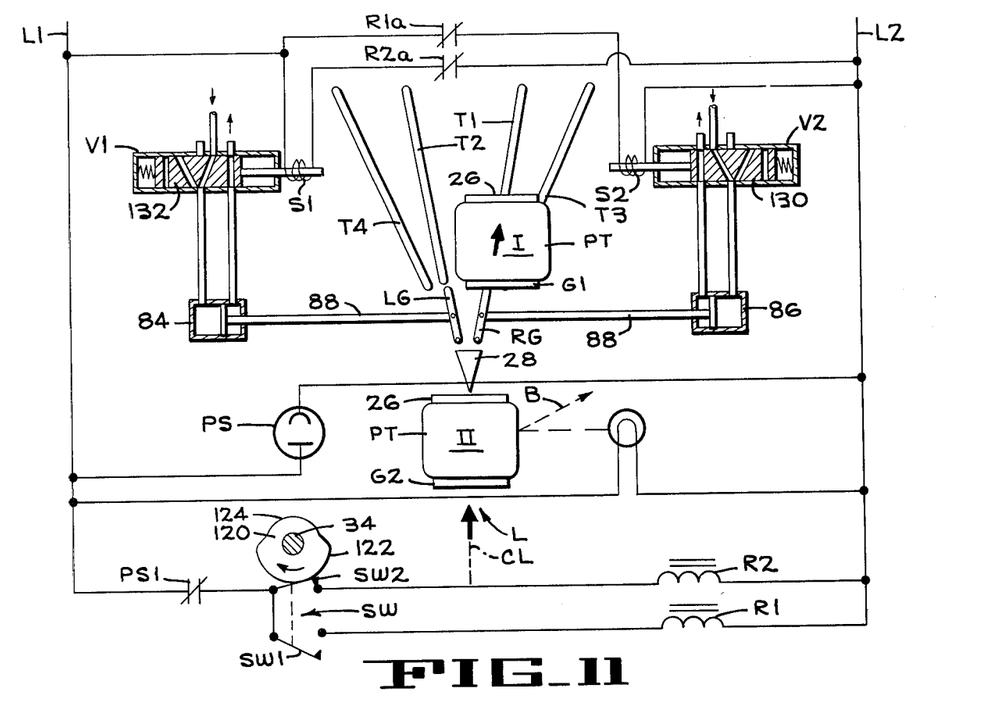
Figure 12:
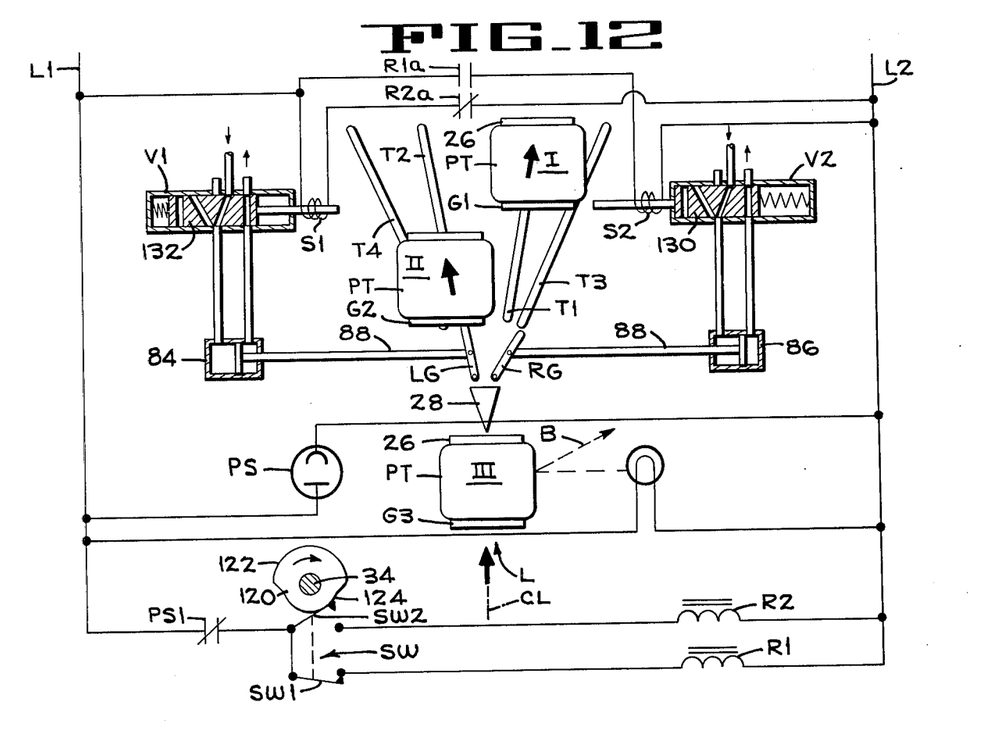

In FIG. 11, the next incoming tray PT (number II) is in a position to be sensed by the scanner PS when the cam 120 has closed the switch contacts SW2. The scanner contacts PS1 again momentarily close and complete the circuit to energize the latching relay R2. Relay contacts R2a close, energizing the solenoid S1 to shift the core 132 of the air valve V1, and the air cylinder 84 is thereby actuated to align the gate LG with the guide track T2. The group G2 support bars for tray number II are diverted by the cam 28 to the left side of the centerline CL, and follow the gate LG to direct the group G2 support bars and tray number II along the guide track T2 to eventually discharge the tray in lane L2 (FIG. 1).

At this point it should be noted that the interspacing of the trays number I and number II, as shown in FIG. 11, is not to scale. This can readily seen with reference again to FIG. 3 where it is shown that the support bar groups G1, G2, G3 and G4 are laterally diverted from one another, but retain their longitudinal relation. The significance of this is that high speed operation is achieved, yet the operating mode allows one gate LG or RG to be carrying out its switching function to guide one group of support bars, while the other gate is free of any contact with the depending switch pins of the support bars and can be prepositioned to intercept and switch the next incoming group of support bars.

Further briefly digressing from the control circuit description, it will be apparent at a total output of trays in the order of 180 per minute, each gate LG or RG will have to divert 90 trays per minute, or one every two-thirds of a second, and that the scanner contacts PS1 are only briefly closed. Accordingly, in the actual embodiment of a commercially acceptable control circuit, time delay contacts are interposed between the scanner contacts PS1 and the latching relays R1 and R2 to assure that the energy supplied to the relays is of long enough duration to positively actuate their respective contacts.

The tray PT, number III (FIG. 12) is supported by the group G3 support bars destined for the right hand outside lane L3 (FIG. 1). Cam 28 will initially divert this tray toward the gate RG, which must be switched from its former position to align with the guide track T3. Cam 120 has rotated to close the switch contacts SW1 and tray number III has intercepted the beam B to close scanner contacts PS1 and energize the latching relay R1. Relay contacts R1a open to deenergize the solenoid S2 and allow the spring-biased valve core 130 of the valve V2 to shift to the left. This allows air to energize the air cylinder 86 in a direction shifting the gate RG into alignment with the guide track T3, and the tray III will be ultimately discharged from lane L3 (FIG. 1).

In FIG. 13 it is assumed that tray number IV (indicated in phantom outline) is missing from the next incoming group G4 of tray support bars. Since the light beam B is unbroken, the scanner contacts PS1 remain open, latching relay R2 is not energized, and the group G4 support bars follow the left side of the cam 28, pass the gate LG, and follow the track T2 toward lane L2 (FIG. 1). Since the group G4 support bars carried no tray and the next incoming group G1 (refer to FIG. 1) of support bars is automatically destined to be diverted to the right side of the centerline CL, the next group of support bars destined for the left of the machine, namely, the group G2 support bars (assuming a tray is carried thereon) will in effect become group G4.

One step is omitted between FIGS. 13 and 14, that step being the diversion of the next tray number I (shown in FIG. 14) and its support bar group G1 being channeled along the path previously shown and described for the first incoming tray. The succeeding tray and support bars, which would normally be tray number II and group G2 if no tray had been missing from the preceding group G4 support bars, will now become tray number IV and support bar group G4. Thus, the substitute tray number IV now interrupts the light beam B, closing the scanner contacts PS1 to energize the latching relay R2 through the cam-closed switch contacts SW2. Relay contacts R2a close to energize solenoid S1 and shift the core 132 of the air valve V1 in a direction retracting the gate LG from its former position, and into alignment with the guide track T4 to direct tray number IV to the discharge lane L4 (FIG. 1). It will be apparent that the formerly described cycle will then repeat. It is also believed apparent, without a specific description of the same, that if any of the other trays than the one indicated should be missing, the control circuit will automatically route the next tray, destined for the same side the missing tray would have traveled, to replace the missing tray. Similarly, it is deemed obvious that if two or more trays are missing in sequence, the control circuit will still automatically route the first incoming tray toward its designated discharge lane.

From the preceding detailed description, it is evident that by routing alternate groups of the support bars left and right, and then alternately actuating the switching gates LG and RG — if the supply of articles is not interrupted — that the gates can more rapidly direct the articles to their discharge lanes than if only one gate handled the entire output. Coupled with the rapid discharge rate is the capability of the article feeding system to supply the articles in the same general repetitive discharge sequence even if occasional articles may be missing in the input lane. Thus, in effect, the control circuit upon sensing a missing article will rearrange the number sequence 1, 2, 3 and 4 of the groups of carrier bars following the missing article. In this way, the first article number I of a group always discharges from the right side of centerline CL in lane L1, followed by articles numbers II, III and IV discharged respectively from the left side of the centerline in lane L2, then from the right outside in lane L3 and then from the left outside in lane L4.

Although the best mode contemplated for carrying out the present invention has been herein shown and described, it will be apparent that modification and variation may be made without departing from what is regarded to be the subject matter of the invention.

What is claimed is:

1. In an article feeding mechanism for continuously dividing one lane of articles into four lanes including an endless driven conveyor having an upper and lower reach, said conveyor comprising a series of laterally shiftable article carriers, each of said carriers having a single fixed switch pin, and guide means at the upper reach for engaging the carrier switch pins for diverting a single lane input of carriers on the upper reach into a multiple lane output of carriers, lower cam means at said lower reach for arranging the carriers into alternate separate groups so that when the carriers of one group reaches the upper reach its switch pins are laterally offset from the switch pins of the carriers of the following group, the switch pins of alternate groups thereby being disposed in separate lanes at the upstream end of said upper reach, said guide means at the upper reach comprising fixed upper cam means having an apex that is straddled by the pins of alternate groups, the pins of successive groups alternately engaging opposite sides of said fixed upper cam means to laterally shift the carriers of one group into one intermediate lane and to laterally shift the carriers of the following group into another intermediate lane, two diverging discharge lanes for each intermediate lane, a single movable gate for each of said intermediate lanes for diverting the carriers in each intermediate lane to one or the other of the associated discharge lanes; the improvement wherein said lower cam means is a fixed cam, means for sensing the presence of an article on each group of carriers at the inlet end of said upper reach, and control circuit means connected to said sensing means, said control circuit means comprises means for alternately actuating said gate means for said intermediate lanes, in response to the sensing of an article on alternate groups of said carriers by said sensing means.

2. In an article feeding mechanism including a conveyor having an upper reach with laterally movable article carriers, said carriers having depending switch pins, and gate and track means that guide the carrier pins for arranging a single lane input of articles into a multiple lane output; the improvement wherein said article carriers are arranged in two separate groups, each carrier being provided with a single fixed switch pin, the input end of said upper reach having a lane for the switch pins of each group, cam means in the path of said pins for laterally separating the two groups of carriers, movable gate means in the path of each of said carrier groups for further diverting the carriers of each group toward one or the other of two discharge lanes, and control means for operating said gate means to direct the carriers of each group toward their two associated discharge lanes, means for sensing the presence of an article on each group of said carriers in said input lane, said gate means being alternately actuated in response to the sensing of the presence of an article on each group of said carriers at said input lane, said control means being effective to maintain each of said gate means in its formerly actuated position until an article on a group of carriers destined for that gate means is detected by said sensing means, said control means including a cam operating in timed relation to the movement of said article carriers along said conveyor reach, a pair of contacts operated alternately by said cam, a relay energized by each contact, said sensing means comprises, and a photoelectric sensor for detecting the presence or absence of an article on each group of carriers, said photoelectric sensor preconditioning said control means to actuate the gate corresponding to a given group of carriers in the presence of an article thereon, or to interrupt the control circuit to maintain the former position of the gate means in the absence of an article, one of said carrier groups being discharged at the left side of the longitudinal centerline of said conveyor reach and the other of said carrier groups being discharged at the right side of said conveyor reach, said control means including means for separately actuating said gate means to independently control the left side group of carriers and the right side group of carriers, either of said gate means being effective to divert its associated carrier groups with or without prior actuation of the other gate means.

* * * * *